US006997973B2

(12) United States Patent
 Kilgore

(10) Patent No.: US 6,997,973 B2
(45) Date of Patent: Feb. 14, 2006

(54) CYCLONE WITH PLUG PREVENTION

(75) Inventor: David P. Kilgore, Commerce, GA (US)

(73) Assignee: Huber Engineered Woods LLC, Charlotte, NC (US)

(*) Notice: Subject to any disclaimer, the term of this patent is extended or adjusted under 35 U.S.C. 154(b) by 89 days.

(21) Appl. No.: 10/724,765

(22) Filed: Dec. 2, 2003

(65) Prior Publication Data
US 2005/0115408 A1 Jun. 2, 2005

(51) Int. Cl.
 B01D 45/12 (2006.01)
 B01D 35/153 (2006.01)
(52) U.S. Cl. .............. 95/271; 55/433; 55/459.1; 55/466; 222/200
(58) Field of Classification Search ............ 55/424, 55/432, 433, 459.1, 466; 95/271; 222/200
 See application file for complete search history.

(56) References Cited

U.S. PATENT DOCUMENTS

| 3,993,460 A | 11/1976 | Gooch et al. |
| 5,058,777 A * | 10/1991 | Omoto et al. ............ 222/200 |
| 5,215,559 A | 6/1993 | Eriksson |
| 5,562,806 A | 10/1996 | Abdulmassih et al. |
| 6,206,202 B1 | 3/2001 | Galk et al. |
| 6,596,169 B1 | 7/2003 | Rong et al. |

* cited by examiner

Primary Examiner—Robert A. Hopkins
(74) Attorney, Agent, or Firm—Carlos Nieves; Raymond Hoch

(57) ABSTRACT

Cyclone separator for separating wood pieces and gas that includes a deagglomerator mechanism that prevents wood piece masses, clumps, wads and the like from plugging or clogging up the system.

15 Claims, 4 Drawing Sheets

US 6,997,973 B2

CYCLONE WITH PLUG PREVENTION

FIELD OF THE INVENTION

The present invention relates to a cyclone separator, and, in particular, a cyclone separator with plug prevention.

BACKGROUND OF THE INVENTION

Lignocellulosic composite boards, such as oriented strand board ("OSB"), flake boards, wafer boards, wood particle boards, and the like are generally formed of wood "flakes" or "strands" bonded together by a resin binder under heat and compression to provide a unitary board structure. For OSB boards, for instance, the wood flakes are made by cutting logs into thin slices with a knife-edge oriented parallel to the length of a debarked log. The cut flakes are broken into narrow strands generally having lengths oriented parallel to the wood grain that are larger than the strand widths.

In one fabrication arrangement for making such composite boards, the green wood flakes are dried to remove water to a level more conducive for subsequent processing. For instance, dried flakes are easier to handle and process in subsequent coating operations in which a thin layer of binder and sizing agent is applied to them before board consolidation operations.

In one arrangement, the green wood flakes are dried in a large industrial forced-air dryer, and then are conducted to a cyclone as a wood piece-laden gas. The cyclone is used to separate the dried wood flakes from the transport gas, which is usually air.

A cyclone comprises a hollow body defining an interior space having a cross-section that tapers inward towards the bottom. Cyclones are often constructed with an upper cylindrical portion and a lower frustoconical portion. A gas having entrained solid particles enters via a tangential or involute inlet towards the upper end of the cyclone body and passes out through an outlet near the bottom end of the cyclone body. The geometry of the cyclone body induces helical downward spiral flow of the wood piece-laden gas inside the cyclone in a radially inner region of the interior space. The gas flow changes direction near the bottom of the cyclone, and an air core spirals upwardly through a radially central region of the space inside the cyclone. The spirally flow of the gas applies a centrifugal force to particles entrained and suspended within the gas and exerts differing forces on the particles depending on their size and/or specific gravity. In general, heavier or larger particles are radially displaced towards the radially outer region of the interior space of the cyclone body, while gas, and very fine particles if present, tend to gravitate towards a radially central region of the interior space from where they are carried upwardly with the air core which flows out through the gas exhaust outlet of the cyclone body.

Ideally, the cyclones are operated continuously and should provide a steady controlled rate of flakes settling at the discharge end of the cyclone body where they can be collected and discharged from the cyclone in an orderly fashion for subsequent processing. Newly installed cyclone systems that are operated within original appropriate design specifications and associated conditions generally can operate in that manner. Conventional cyclone arrangements have not been equipped with built-in means to handle the occurrence and presence of large clumps of flakes or other solid materials inside the cyclone during a production run which may clog or jam up narrower sections or components of the cyclone.

However, the present investigators have observed that cyclones that have already been in use for some period of time and/or cyclones which encounter abnormal or significant sudden fluctuations in operating conditions can be at risk of large masses of flakes entering or forming inside the cyclone that plug up the narrowed bottom part of a conventional cyclone separator.

The present invention addresses a need for improvements in cyclone separator technology, especially for retrofitting existing systems already in use and/or systems susceptible to operated outside design or normally expected conditions, whereby flake or particle plugs can be prevented from forming within cyclones during operation, which in turn eliminates production delays and costs associated with removing such plugs from a cyclone.

SUMMARY OF THE INVENTION

The present invention relates to an improved cyclone separator for separating wood pieces and gas that includes a deagglomerator feature that prevents wood piece masses, clumps, wads and the like from plugging or clogging up the cyclone separator.

A deagglomerator has been devised as part of the present invention which prevents wood piece masses from plugging or clogging up vortex breakers and/or wood piece discharge units on cyclone separators, yet without interfering with or disrupting fluid flow patterns needed for efficient wood piece-gas separation within the cyclone separator. The present investigators have recognized that abnormal operating conditions can and do arise in cyclone systems which significantly increase the risk and reality of plug formations occurring within certain cyclone systems. The present invention resolves this problem by introduction of the deagglomerator in the vortex breaker as described herein. Moreover, this solution is cost-effective, especially in cyclone systems otherwise susceptible to recurring plugging events.

In one embodiment, a cyclone separator is provided including a cyclone housing defining an interior space that has an inlet for receiving a mixture of wood pieces and gas, and a gas exhaust outlet and a wood piece dispensing outlet from which wood pieces exit the cyclone housing. A vortex breaker is in communication with the second outlet of the cyclone housing and operates to separate the wood pieces from the gas received from the cyclone housing. A wood piece discharge device is connected to a side of the vortex breaker opposite to the second outlet of the cyclone housing. An important feature is a deagglomerator positioned within the vortex breaker that is operable to break up wood piece masses which enter the vortex breaker into smaller wood piece masses or individual wood pieces or both before reaching the wood piece discharge device.

In one particular embodiment, the deagglomerator comprises at least two rotary members positioned within the vortex breaker, from which a plurality of integral rigid fingers extend along a longitudinal length of each rotary member. In order to "chew" up wood piece masses that may drop into the vortex breaker, the rotary members are operably positioned for rotation such that fingers of each rotary member pass through spaces between fingers on the other rotary member with clearance from the other rotary member. In one aspect, the fingers extend generally perpendicularly from the rotary members, and in another, the rotary members are fixed for rotation within the vortex breaker such that the rotary members extend generally perpendicularly to a central axis of the cyclone.

In another particular embodiment, the wood piece discharge device comprises an air-lock having a rotatable part comprising multiple wood piece-receiving pockets integrally positioned around the circumference of a rotary support, a stationary part comprising a housing for the rotatable part wherein the housing includes upper and lower openings. One pocket can be rotated into position for receiving wood pieces at the upper housing opening while another pocket is positioned at the lower housing opening for dispensing wood pieces in a substantially air tight manner.

In yet another embodiment, a method for preventing wood piece plugs in cyclone separators is provided using the built-in deagglomerator arrangement as described herein.

BRIEF DESCRIPTION OF THE DRAWING

The drawings are illustrative and are not necessarily drawn to scale. Features in different figures that are identified with the same numeral refer to the same feature.

DETAILED DESCRIPTION OF THE INVENTION

Figure 1:
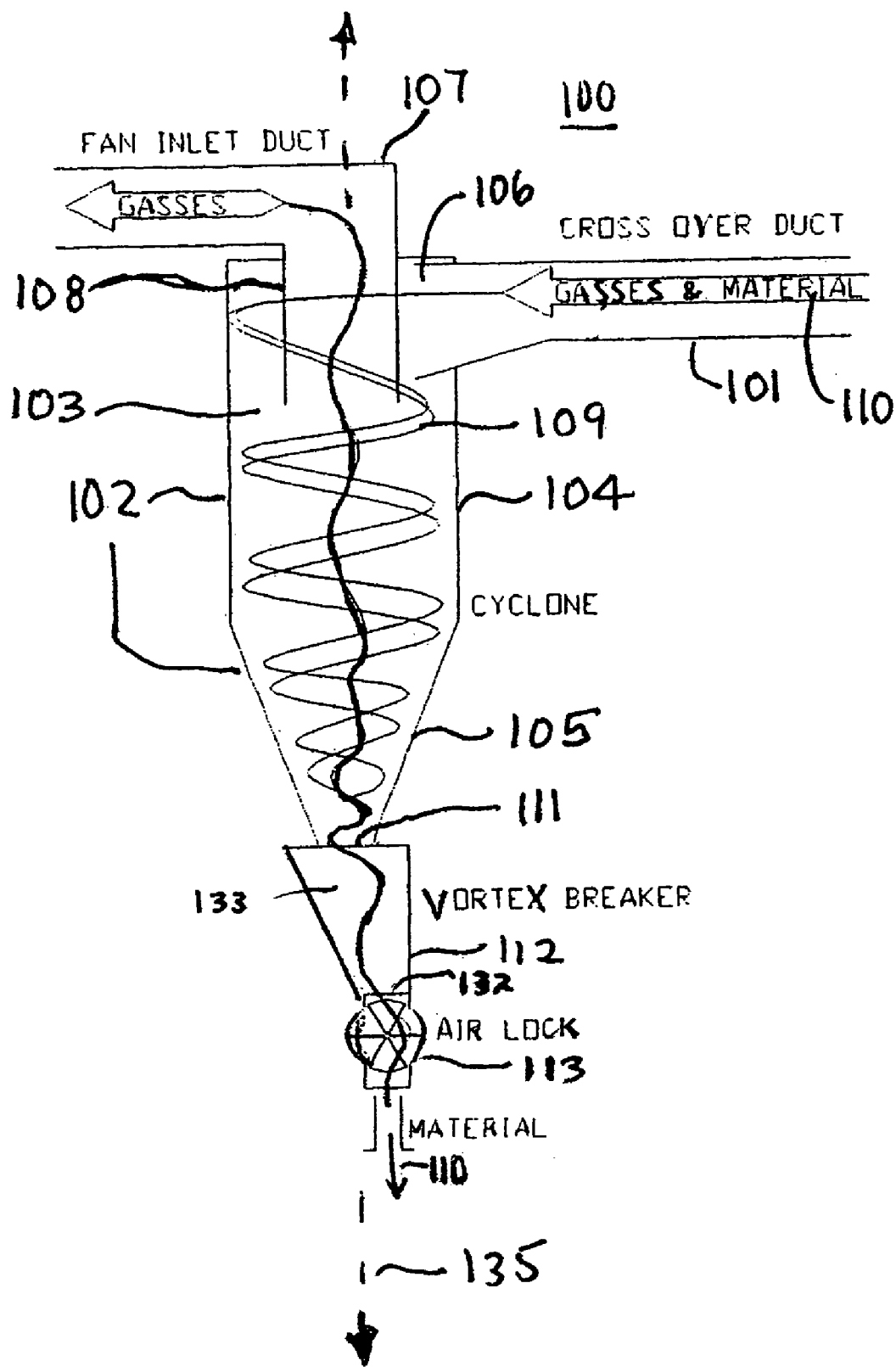
FIG. 1 is a schematic cross section view of a cyclone separator in a normal operational state without wood piece clump formation.

Referring to FIG. 1, a cyclone separator 100 is shown operating under and in conformance with normal design conditions. A crossover duct 101 connects a wood piece dryer (not shown) with the cyclone housing 102. The cyclone housing defines an interior space 103, and has an upper hollow cylindrical section 104 and a lower hollow frusto-conical section 105. Gases and wood pieces 110 are transported through the crossover duct 101 to a cyclone inlet 106 by a pressure difference created in the air system. The wood piece-laden gas enters the cylindrical housing 102 tangentially at one or more points, and gas leaves through a exhaust duct 107 that includes a cylindrical portion 108 generally centered about the cyclone's longitudinal axis 135 that extends into a central region of the cyclone's interior space 103 a distance that is adjustable. The cylindrical portion 108, as such, may be used as a vortex finder according to generally understood principles. The exhaust duct 107, in this illustration, serves as an inlet for the suction side of a fan (not shown) that creates sufficient suction to pull the gasses and wood material through the cyclone separator 100 for processing therein.

The wood pieces, by virtue of their inertia, will tend to move toward the cyclone housing wall, and they travel downward along a spiral path 109 while suspended in gas until they reach a lower outlet 111 which is an opening at the bottom of the cyclone housing 102.

The spiral stream of air containing the wood pieces 109 descend all the way through cyclone housing 102 until it exits the cyclone housing 102 and enters a vortex breaker 112. The vortex breaker 112 defines an air pocket which funnels the fibrous material into a wood piece discharge device 113, which is illustrated here as a rotary valve, and in particular an air-lock. In this illustration, the vortex breaker 112 comprises a housing that is generally box-shaped (e.g., see FIG. 4), such that defines an interior air space 133 bounded by walls and squared corners, and the walls taper down to a narrower width as they approach the wood piece discharge device 113. This geometry disrupts the downward flowing air flow within the cyclone such that the suspended fibrous material drops down and is funneled into the air-lock 113, while the air stream flows back upward in the central region of the vortex breaker 112 and cyclone housing 102. The air-lock 113 functions to discharge wood pieces 110 but not gas from the cyclone.

Figure 3:
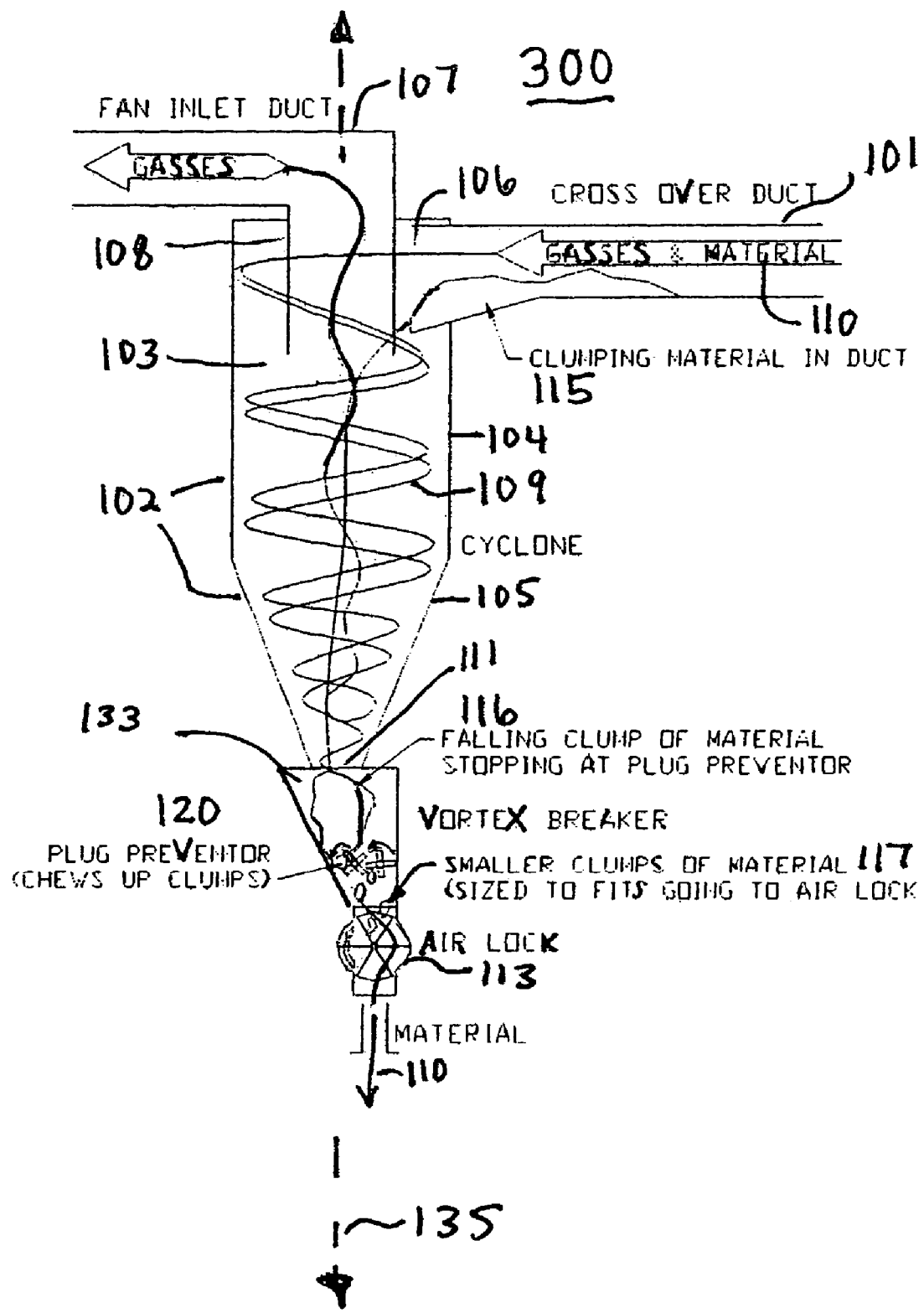
FIG. 3 is a schematic cross section view of a cyclone separator in accordance with an embodiment of the present invention in which an abnormal operational state exists causing large clumps of wood pieces to form and fall into the bottom section and parts of the cyclone where they are broken up before plugging the system.
Figure 4:
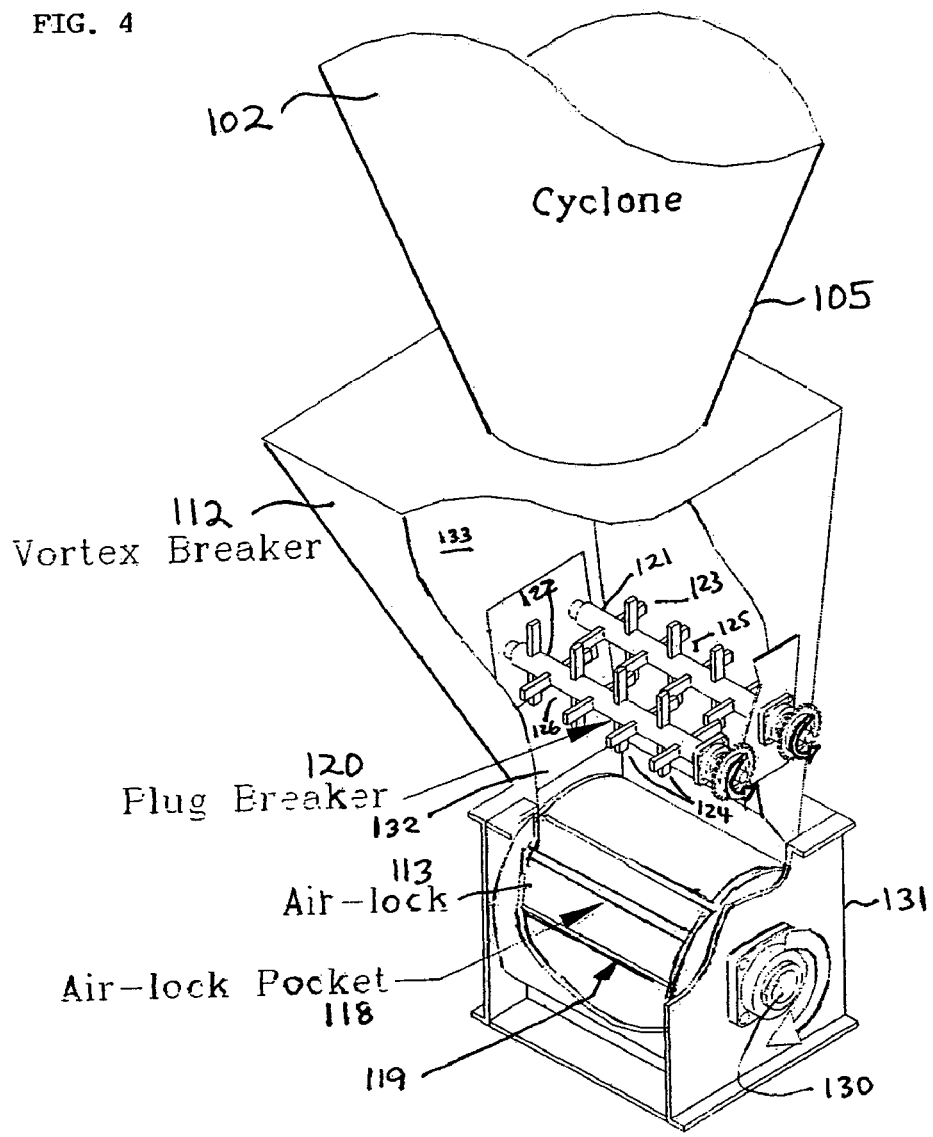
FIG. 4 is an enlarged schematic part section, part perspective view of part of a cyclone separator including a cyclone body, air-lock, and vortex breaker with a built-in plug breaker in accordance with an embodiment of the present invention.

The air-lock 113 itself shown in FIG. 1 (and FIG. 2) may have a configuration and functionality similar to that shown for air-lock 113 as used in the embodiment shown in FIG. 4. In general, the air-locks 113 illustrated in FIGS. 1–3 all are designed to operate as a pocketed rotary dispenser in that a plurality of pockets 118 are defined around the circumference of a common rotary member 130 positioned within a housing 131.

A pocket 118 is loaded with wood pieces as it rotates to the top position within housing 131 where it is exposed to a lower open end 132 of the vortex breaker 112, while a pocket on the opposite side of the rotary member faces downward to dump wood pieces out of the cyclone for further processing. In particular, the air-lock 113 is designed such that a motor drive (not shown) operably connected to the rotary member 130 sequentially rotates each pocket 118 into a receiving position at the open lower end 132 of the vortex breaker 112 where it is held for a controlled period of time while its pocket fills with fibrous material. After a given period of time, the motor drive rotates the pockets in a circular direction so the next pocket moves into receiving position and the most recently filed pocket rotates down toward the discharge position. The air-lock 113 thus, in design, is intended to function to permit discharge of the fibrous material while maintaining negative pressure within the cyclone by forcing the gasses inside the cyclone to travel back up and out the exhaust duct 107 duct at the top of the cyclone. The air-lock prevents the gases from escaping out the bottom of the cyclone which would undermine the vortex affect.

Figure 2:
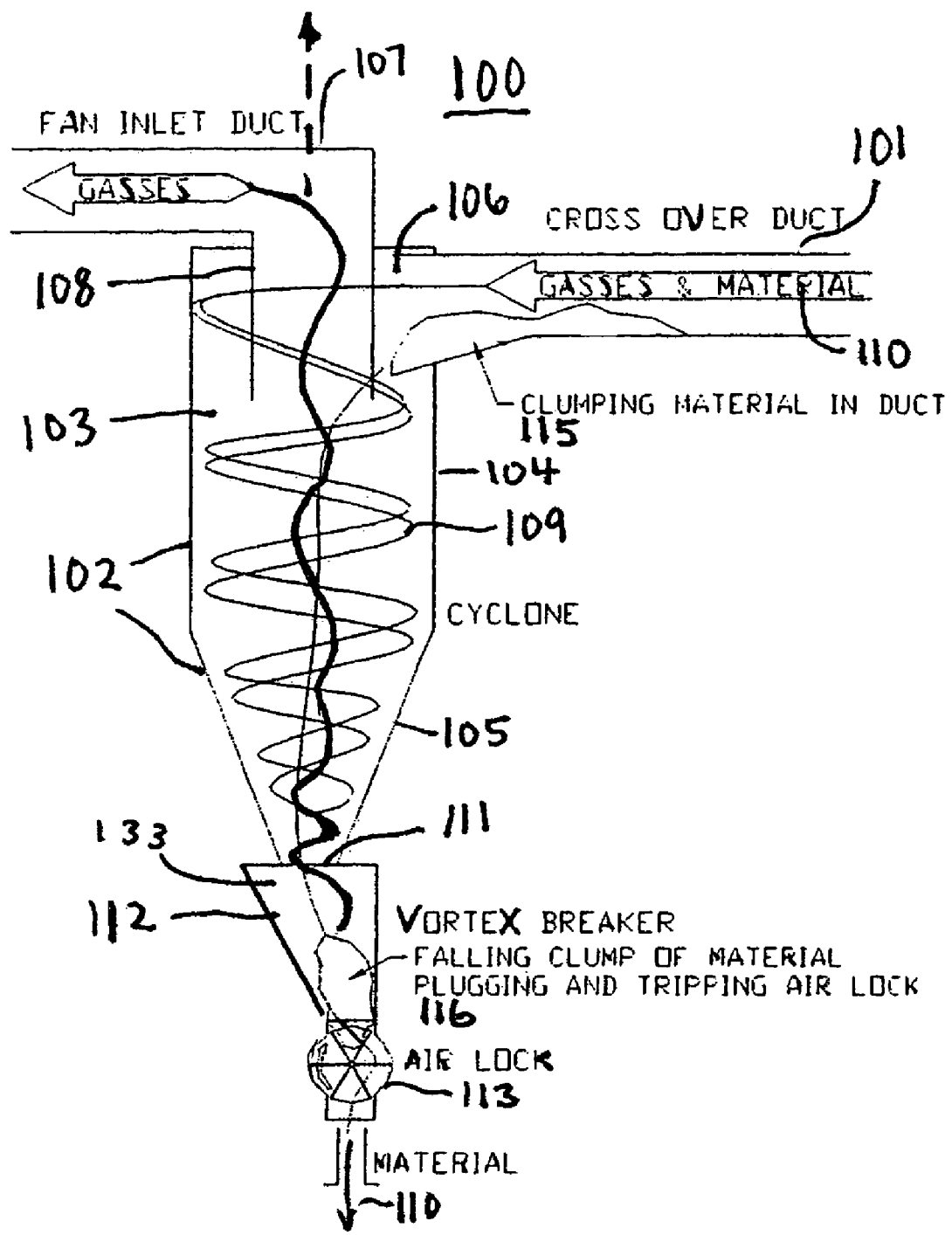
FIG. 2 is a schematic cross section view of a cyclone separator in an abnormal operational state in which large clumps of wood pieces have formed and fallen into the bottom section and parts of the cyclone separator.

Referring now to FIG. 2, a problem addressed by the present invention concerns the problem of large clumps of wood pieces 116, or other solid particle masses, introduced into cyclone separators that clog or plug up the solid material discharge end of the cyclone.

Clumps or masses of wood pieces can drop rapidly into the bottom of a cyclone for several reasons. For one, when the air (fan) system is turned off (such as do to an unexpected power outage or system maintenance) and then back on, or alternatively power surges occur in the air (fan) system, clumps of wood pieces 115 that often tend to collect in the feed duct 101 between the dryer and cyclone 100 may be drawn or pushed into the cyclone housing 102 as a large clump or clumps all at once, where they fall through the cyclone housing and into the vortex breaker 112. The large clumps of wood pieces can not become suspended as individual matter in the spiral wood piece/air stream 109 due to their large mass, and instead basically free fall as a clump into the vortex breaker 112.

Moreover, as the clump of wood pieces 116 accumulates in the bottom of the vortex breaker, at some point it will have sufficient size to disrupt the air stream profile required to support the vortex effect otherwise created within the cyclone to suspend and separate wood pieces from gas. This will further increase the incidence of wood masses or clumps dropping into the vortex breaker.

Another cause of the problem arises from a leaky, non-air tight cyclone system, vortex breaker and/or or airlock which undermines the normal operation of the cyclone such that wood pieces are not properly suspended in a vortex and fall as clumps to the bottom of the cyclone. The static pressure and power that the fan must develop for the cyclone to operate properly is correlated to the friction loss experienced within the cyclone, which in turn is related to the cyclone's pressure drop. Leaks in the system can destabilize the necessary pressures conditions within the cyclone, such that the power capabilities of the fan may be exceeded, and, as a result, wood pieces drop too rapidly in clumped form through the cyclone housing 102 into the vortex breaker 112.

Whatever their cause, such clumps of wood pieces may form a "bridge" 116 of wood pieces amassed within the vortex breaker 112 and over the air-lock 113 in a manner such that no loose wood pieces can enter into the air-lock 113. The occurrence of this event can be detected by the lack of wood pieces being unloaded by the air-lock 113 during operation of the cyclone.

Alternatively, a sufficiently large clump of wood pieces may be fed into a pocket 118 of the air-lock 113 which may lead to wood pieces wedging between the pocket veins 119 and the interior stationary walls of the housing 131 of the air-lock 113, and as a consequence the rotary member 130 gets jammed and cannot rotate. This is especially a problem when a clump of wood pieces has larger volume than the pocket it drops into. The air-lock motor (not shown), which is used to rotate the rotary member 130 of the air-lock 113, often can not overcome the counterforce created by such wedges. The motor will need be shut down, when such a wedge occurs, so that the wedge can be cleared. This may be done automatically through tripping of the motor's electrical breaker.

When the air-lock is shut down, then the dryer system generally also will then need to be shut down as they are an integrated system designed to operate continuously together. As a practical mater, the dryer fan may still be run for a short period of time after the air-lock motor shuts down sufficient to transport the wood pieces still remaining in the dryer over into the cyclone for safety reasons, i.e., piling heated wood pieces in the dryer is not desirable.

Whether the plug of fibrous material has formed in the vortex breaker 112 or in the air-lock 113, the fibrous material plug that has formed in the cyclone must then be manually removed, which can take considerable amounts of time, such as 1–2 hours in large capacity cyclone systems. As a consequence, downstream operations that rely on the dry wood piece feed have to be slowed down or temporarily stopped until the plug in the cyclone is cleared. This down time on the cyclone for maintenance and slow down time in downstream operations can be costly, especially when the plugging problem occurs on a regular basis.

As previously mentioned, the cylinder (vortex finder) 107 can be moved vertically up or down in the middle of the cyclone chamber to different positions to adjust the air pressure (pressure drop) inside the cyclone. However, the pressure drop adjustment made possible with cylinder 107 is limited, and it can not compensate for significant abnormal operating conditions or events occurring in the cyclone, such as those that may be caused by fan power disruptions or serious structural leak problems on the cyclone or ducting, or other factors described herein associated with causing wood piece clumping.

The present invention has solved the cyclone plugging problem by providing a built-in plug preventor device that deagglomerates masses or clumps of wood pieces or other types of solid particles in the vortex breaker of a cyclone separator.

Referring now to FIG. 3, which illustrates one non-limiting embodiment of this invention, the cyclone separator system 100 of FIGS. 1 and 2 has been modified to incorporate a deagglomerator 120 in the vortex breaker 112. For purposes of this illustration, the cyclone system 300 otherwise is essentially the same as previously discussed cyclone separator system 100. It will be appreciated that the cyclone separator 300 can be operated on the suction side or pressure side of a fan.

In cyclone separator 300, wood piece agglomerates or clumps dropping into the vortex breaker 112 of the cyclone are broken up by the deagglomerator 120 into smaller clumps and/or individual wood pieces sufficient that no clogging bridge of wood pieces forms within the vortex breaker and the wood pieces can be dispensed from the cyclone air-lock 113 without jamming up that mechanism.

The deagglomerator 120 breaks-up wood piece clumps 116 in vortex beaker 112 and effectively meters the rate and amount of fibrous material that reaches the air-lock 113 in a manner to prevent overloading the air-lock 113. In effect, the plugging material 116 is broken into smaller masses to even out the flow to the air-lock 113.

In one preferred embodiment, the deagglomerator 120 is located near the bottom of the vortex breaker 112, so that it does not disrupt the desired air-flow profiles in the cyclone system. This location can be determined by empirical testing.

Referring to FIG. 4, in one particular embodiment, the deagglomerator 120 comprises at least two rotary members 121 and 122 positioned in a spaced apart, generally parallel relationship within the interior space 133 of vortex breaker 112. A plurality of integral rigid fingers 123 and 124 extend from each respective rotary member 121 and 122 along a longitudinal length of each rotary member. The rotary members are motor driven and/or manually crankable. As continuous rotation of the rotary members 121 and 122 is preferred during a cyclone operation, motor drive is preferred as the primary drive system. A provision for means to manually crank the rotary members may be useful as a back up system. The rotary members 121 and 122 and associated fingers preferably are sized and positioned within vortex breaker 112 near its bottom opening 132 effective to present a cross-sectional profile on which large fiber clumps will land that have a size that can clog the cyclone system, before they reach the air-lock.

In one embodiment, the rotary members 121 and 122 are installed for rotation within the vortex breaker 112 such that the rotary members extend generally perpendicularly to a longitudinal axis 135 of the cyclone housing 102. As indicated in FIG. 4, the rotations of the rotary members 121 and 122 and their respective fingers 123 and 124 on the deagglomerator 120 are in the same rotational direction, which is opposite to the rotational direction of the rotary air-lock 113. This helps provide a fluid motion through the system. In one embodiment, fingers 123 and 124 extend generally radially from the rotary members.

Figure 5:
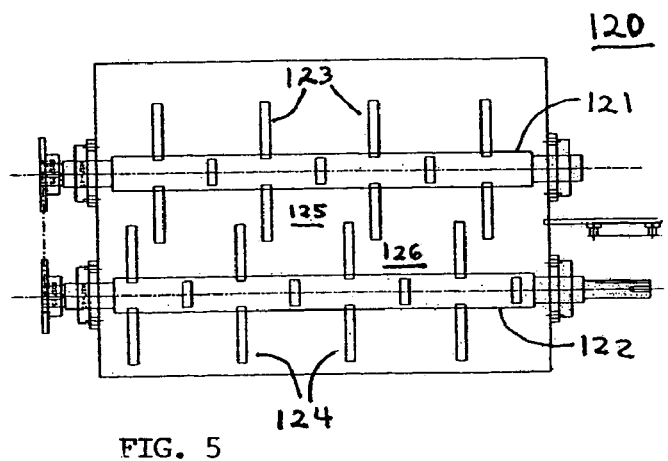
FIG. 5 is an enlarged schematic top elevation view of the plug breaker in accordance with an embodiment of the present invention.

Referring to FIG. 5, the rotary members 121 and 122 are operably positioned for rotation, wherein sets of fingers 123 and 124 of each respective rotary member pass through lateral spaces 125 and 126 provided between fingers on the other rotary member with clearance from the other rotary member during their rotation. In this way, the sets of fingers 123 and 124 are interdigited and intermesh (without contacting each other) during rotation of the rotary members 121 and 122 to create a shredding and chewing affect on material that has fallen on top of the deagglomerator 120 which breaks up the clumps into smaller clumps or individual fibers of a size that pose no threat of plugging or clogging the system. In one embodiment, the deagglomerator 120 is operated such that the rotary members 121 and 122 rotate at a relatively slow yet continuous speed. This speed of rotation of rotary members 121 and 122 may suitably be, for instance, about 20 to 30 rpm for many applications.

In general, the shape and spacing of the fingers as well as the slow rotation speed of the deagglomerator permits the fibrous material to flow through the air-lock without plugging occurring. In this manner, disruptions of the cyclone operation and related process systems are not caused by plugging events that occur in the cyclone system. Production downtimes and associated costs otherwise incurred for plug removal on the cyclone are eliminated by the present invention. The deagglomerator arrangement of the present invention can be installed on new cyclone systems or retrofitted on older cyclone systems. The deagglomerator arrangement of the present invention is especially beneficial for extending the useful life of cyclone systems that are older and less-air tight (leaky) such that the cyclone is encountering clumps of material that can plug or clog the cyclone system. The deagglomerator arrangement of the present invention will resolve those plugging problems.

Also, in other optional aspect, the gas exhausted from cyclone via duct 107 may be conducted to an air-cleaning unit (not shown) to filter out very fine particulates out of the exhaust gas stream, which were not separated from the gas by the cyclone.

Lignocellulosic materials used as the wood pieces processed with the cyclone separator 300 of this invention are derived from naturally occurring hard or soft woods, singularly or mixed. Typically, raw wood starting materials, either virgin or reclaimed, are cut into strands, flakes, wafers, chips, particles, and so forth, of desired shape.

In one non-limiting embodiment, the lignocellulosic wood strand/flake materials that are processed in the cyclone separator are obtained through dimensional reduction of logs into discrete strands. The sizes of these strand or flake materials, in general, are in a range of about 0.28 to about 8 inches (about 0.7 to about 15–20 cm), more particularly about 0.75 to about 5 inches, in length, and about 0.1 to about 2 inches (about 2.5 to about 5 cm) in width, and about 0.001 to about 0.040 inches (about 0.0025 to about 0.1 cm) in thickness. The moisture content of wood strands generally is in a range from 3 to 12% after being dried.

For purposes of wood piece and gas separation procedures, the plug prevention system of this invention is generally applicable to cyclone systems of all sizes and scales. In one non-limiting embodiment, for instance, cyclone systems processing about 25,000 to 35,000 pounds wood pieces/hour fed into a cyclone having a maximum diameter of about 12 feet from a forced air dryer via about a 42 inch diameter feed duct in which the wood pieces are suspended at velocities of about 4,500 ft/min within the ductwork, the wood pieces then slow down and fall out in the cyclone, and air-lock is used that has six 6 ft$^3$ capacity pockets which are rotated continuously by their rotary member at 30 rpm loading/unloading location.

In a non-limiting implementation, the deagglomerator used in such a cyclone system includes two rotary members fixed for continuous rotation at about 20 to 30 rpm near the bottom of the vortex breaker but clearing the pocket spaces of the air-lock, in which a plurality about 4 to 8 inch long, 2 to 6 inch thick fingers or paddles are integrally mounted around the circumference of each rotary member and with about 8 to 42 inch gaps between adjoining fingers. The rotary members are positioned in a spaced apart orientation and generally parallel to each other such their finger intermesh with each other during rotation of the rotary members. The fingers of each rotary member pass through an air gap provided between adjoining fingers of the other rotary member. In this manner, fibrous masses or clumps falling on the deagglomerator during cyclone operation are "chewed up" into smaller clumps before they drop into a pocket of the air-lock. In this way, no large clumps of wood pieces can form a bridge of wooden material that clogs the vortex breaker or overfill a pocket of the air-lock which in turn leads to a jam of the air-lock.

Although the detailed descriptions herein refer to wood piece and gas separation in a cyclone separator as an exemplary illustration, it will be appreciated that the invention has wider applicability to other types of solid particulate materials that are separable from gases in a cyclone that may experience clumping problems. Moreover, the plug prevention system of this invention generally can be installed in cyclone systems of all sizes and scales where the functionality is desired or needed.

While the invention has been described in terms of its preferred embodiments, those skilled in the art will recognize that the invention can be practiced with modification within the spirit and scope of the appended claims.

What is claimed is:

1. A cyclone separator for separating wood pieces and gas, comprising:
   a cyclone housing defining an interior space and having an inlet for receiving a mixture of wood pieces and gas, and a first outlet for exhausting gas and a second outlet from which wood pieces exit the cyclone housing,
   a vortex breaker in communication with the second outlet of the cyclone housing operable to separate the wood pieces from gas received from the cyclone housing,
   a wood piece discharge device connected to a side of the vortex breaker opposite to the second outlet of the cyclone housing, and
   a deagglomerator positioned within the vortex breaker comprising at least two rotary members positioned in a spaced apart relationship within the vortex breaker, a plurality of integral rigid fingers extend from each rotary member along a longitudinal length of each rotary member, and the rotary members are operably positioned for rotation wherein fingers of each rotary member pass through spaces provided between fingers on the other rotary member with clearance from the other rotary member, wherein the deagglomerator is operable to break up wood piece masses entering the vortex breaker into smaller wood piece masses or individual wood pieces or both before reaching the wood piece discharge device.

2. The cyclone separator of claim 1, wherein the fingers extend generally radially from the rotary members.

3. The cyclone separator of claim 1, wherein the rotary members are fixed for rotation within the vortex breaker such that the rotary members extend generally perpendicularly to a central axis of the cyclone housing.

4. The cyclone separator of claim 1, wherein the wood piece discharge device comprises an air-lock having a rotatable part comprising multiple wood piece-receiving pockets integrally positioned around the circumference of a rotary support, a stationary part comprising a housing for the rotatable part wherein the housing includes upper and lower openings whereby one pocket can be rotated into position for receiving wood pieces at the upper housing opening while another pocket is positioned at the lower housing opening for dispensing wood pieces in a substantially air tight manner.

5. The cyclone separator of claim 1, wherein the first outlet for exhausting gases further comprises a cylindrical portion extending into a radially central portion of the interior space of the cylindrical housing a vertically adjustable distance.

6. A method of separating wood pieces from gas, comprising:
   feeding a mixture of wood pieces and gas into a cyclone housing defining an interior space and having an inlet for receiving the mixture of wood pieces and gas, and an upper outlet and a lower outlet, wherein the wood pieces spiral down the cyclone housing until exiting the cyclone housing via the lower outlet and entering an adjoining vortex breaker;
   disrupting spiral motion of the wood pieces in the vortex breaker;
   providing a wood piece mass deagglomerator within the vortex breaker, comprising positioning at least two rotary members in a spaced apart relationship within the vortex breaker, wherein a plurality of integral rigid fingers extend from each rotary member along a longitudinal length of each rotary member;
   operating the deagglomerator effective to break up wood piece masses entering the vortex breaker into smaller wood piece masses or individual wood pieces or both before reaching a wood piece discharge device;
   discharging the deagglomerated wood pieces with a wood piece discharge device connected to a side of the vortex breaker opposite to the second outlet of the cyclone.

7. The method of claim 6, wherein operating the deagglomerator comprises rotating the two rotary members wherein fingers of each rotary member pass through spaces between fingers on the other rotary member with clearance from the other rotary member effective to break up clumps of wood pieces that enter the vortex breaker.

8. The method of claim 6, wherein the fingers extend generally radially from the rotary members.

9. The method of claim 6, wherein providing the deagglomerator further comprises arranging the rotary members within the vortex breaker such that the rotary members extend generally perpendicularly to a central axis of the cyclone housing.

10. The method of claim 6, wherein the wood piece discharge device comprises an air-lock having a rotatable part comprising multiple wood piece-receiving pockets integrally positioned around the circumference of a rotary support, a stationary part comprising a housing for the rotatable part wherein the housing includes upper and lower openings whereby one pocket can be rotated into position for receiving wood pieces at the upper housing opening while another pocket is positioned at the lower housing opening for dispensing wood pieces in a substantially air tight manner.

11. The method of claim 6, wherein the feeding of the mixture of wood pieces and gas comprises directing the wood pieces and gas via the inlet tangentially against an inner wall of the cyclone housing.

12. The method of claim 6, wherein the rotary members continuously rotate at a speed of approximately 20–30 rpm.

13. The method of claim 6, wherein the wood pieces are selected from at least one of wood strands, wood chips, wood wafers, and wood particles, and combinations thereof.

14. The method of claim 6, wherein the wood pieces comprise wood strands.

15. A cyclone separator for separating wood pieces and gas, comprising:
   a cyclone housing defining an interior space and having an inlet for receiving a mixture of wood pieces and gas, and a first outlet for exhausting gas and a second outlet from which wood pieces exit the cyclone housing,
   a vortex breaker in communication with the second outlet of the cyclone housing operable to separate the wood pieces from gas received from the cyclone housing,
   a deagglomerator positioned within the vortex breaker comprising at least two rotary members positioned in a spaced apart relationship within the vortex breaker, a plurality of integral rigid fingers extend from each rotary member along a longitudinal length of each rotary member, and the rotary members are operably positioned for rotation wherein fingers of each rotary member pass through spaces provided between fingers on the other rotary member with clearance from the other rotary member, wherein the deagglomerator is operable to break up wood piece masses entering the vortex breaker into smaller wood piece masses or individual wood pieces or both before reaching the wood piece discharge device, and
   a wood piece discharge device comprising an air-lock connected to a side of the vortex breaker opposite to the second outlet of the cyclone housing, wherein said air-lock is operable to discharge wood pieces but not gas from the cyclone housing.

* * * * *